F. B. RICHARDSON.
Mold for Enema Syringes.

No. 50,957.  Patented Nov. 14, 1865.

WITNESSES:  INVENTOR.

UNITED STATES PATENT OFFICE.

FRANCIS B. RICHARDSON, OF BOSTON, MASSACHUSETTS.

IMPROVED MOLD FOR ENEMA-SYRINGES.

Specification forming part of Letters Patent No. 50,957, dated November 14, 1865.

*To all whom it may concern:*

Be it known that I, FRANCIS B. RICHARDSON, of Boston, in the county of Suffolk and State of Massachusetts, have invented certain new and useful Improvements in Molds for Enema-Syringes; and I do hereby declare that the following description, taken in connection with the accompanying plate of drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

In forming the necks and orifices of the elastic bulbs used in enema-syringes, &c., it has heretofore been customary to insert a core or mandrel of wood in the neck of the rubber or other material used previous to placing the latter in its mold, so that the elastic fabric would during the process of vulcanization be pressed and formed around the said core or mandrel, which, on being removed, left the necessary aperture in the neck of the bulb. But as no means were employed to hold and steady the core in its proper position, that is exactly on a line with the longitudinal axis of the mold, it frequently during the curing process became displaced, or perhaps it was not always accurately inserted at the commencement, the result being that the orifice was often formed on one side of the bulb instead of in the center thereof, the rubber on one side of the aperture being left thin and weak, and consequently easily broken or torn by use and by the insertion of the metallic tube commonly employed, and on the other side thick and clumsy, and, moreover, causing the bulb to leak.

My improvement consists in the use of a metallic core inserted in the mold previous to the placing of the rubber therein, the said core having a firm bearing in the end of the mold, which is suitably bored and fitted for the purpose. The core, of course, can be made of any desired shape or pattern, and can readily be inserted in or removed from the mold.

The accompanying plate of drawings represents my improvement.

Figure 1:
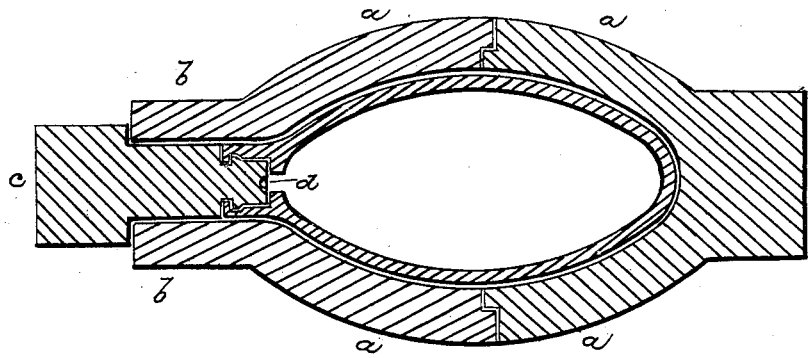
Figure 2:
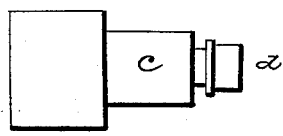

Figure 1 is a central vertical longitudinal section of my improved mold, &c. Fig. 2 is a view of the core or mandrel detached from the mold.

$a\ a\ a$ in the drawings represent the metallic mold in which the elastic bulb is to be formed. One or both ends of the mold $a\ a\ a$ may be rimmed out so as to form a bearing, $b$, through which is inserted a core, $c$, having a suitable-shaped head, $d$, to form the neck of the elastic bulb, into which the metallic tube or shoulder that makes the connection between the bulb and the eduction and induction tubes is to be sprung.

The rubber is placed in the mold in a tacky condition, and may be pressed or fastened in any proper manner around the head of the core. It is then heated in the usual manner practiced by rubber manufacturers until fully formed and cured. The core $c$ is then drawn out, leaving, of course, an aperture or bore in the neck of the bulb.

It will be seen that as the core $c$ has an accurate bearing, $b$, in the mold $a\ a\ a$ exactly on the longitudinal axis thereof, it cannot be misplaced therein or be thrown out of its true line and position during the vulcanizing process, and, consequently, that the elastic material will be formed around it so as to insure a perfectly symmetrical neck and orifice to the bulb, the sides of the same being of uniform thickness around its entire circumference.

It will be evident that my improvement can be applied to any and all kinds of molds for making elastic bulbs and for various other purposes, such as breast-pumps, &c.

Having thus described my improvements, what I claim as my invention, and desire to have secured to me by Letters Patent, is—

In molds for making elastic bulbs of enema-syringes, &c., the use of a core or mandrel having a firm and permanent bearing therein, so as to insure the formation of a true and symmetrical neck and orifice to the bulb, as set forth.

FRANCIS B. RICHARDSON.

Witnesses:
JOSEPH GARETT,
SAML. M. BARTON.